(12) United States Patent
Ruiz et al.

(10) Patent No.: US 10,744,921 B2
(45) Date of Patent: Aug. 18, 2020

(54) PORTABLE ELECTRONIC DEVICE HOLDER FOR TRAY TABLES

(71) Applicant: Safran Seats USA LLC, Gainesville, TX (US)

(72) Inventors: Oscar Ruiz, Chihuahua (MX); Brenda L. Chaaya Aguilar, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 53 days.

(21) Appl. No.: 15/757,511

(22) PCT Filed: Mar. 2, 2016

(86) PCT No.: PCT/US2016/020404
§ 371 (c)(1),
(2) Date: Mar. 5, 2018

(87) PCT Pub. No.: WO2017/048319
PCT Pub. Date: Mar. 23, 2017

(65) Prior Publication Data
US 2018/0244183 A1 Aug. 30, 2018

Related U.S. Application Data

(60) Provisional application No. 62/218,879, filed on Sep. 15, 2015.

(51) Int. Cl.
*B60N 3/00* (2006.01)
*B64D 11/06* (2006.01)
(Continued)

(52) U.S. Cl.
CPC .............. *B60N 3/004* (2013.01); *B60N 2/79* (2018.02); *B60N 3/002* (2013.01); *B60R 11/02* (2013.01);
(Continued)

(58) Field of Classification Search
CPC .......... B60N 3/004; B60N 3/002; B60N 2/75; B60N 2/79; B60N 2/793; B64D 11/0638; B64D 11/0015; A47B 23/042–044
See application file for complete search history.

(56) References Cited

U.S. PATENT DOCUMENTS 3,632,161 A * 1/1972 Arfaras ................... A47C 7/70
297/145
4,865,286 A * 9/1989 Clayburn ............... A47B 19/08
248/460

(Continued)

FOREIGN PATENT DOCUMENTS

| CN | 103358958 | 10/2013 |
|---|---|---|
| GB | 2519599 | 4/2015 |

(Continued)

OTHER PUBLICATIONS

International Patent Application No. PCT/US2016/020404, International Search Report and Written Opinion, dated Jun. 28, 2016.

*Primary Examiner* — David R Dunn
*Assistant Examiner* — Tania Abraham
(74) *Attorney, Agent, or Firm* — Kilpatrick Townsend & Stockton LLP (57) ABSTRACT

A tray table assembly includes a table body and a support. The support can include a first end and a second end distal from the first end. The second end of the support can be pivotably attached to the table body. The support can define a receiving area between the first end and the second end.

13 Claims, 4 Drawing Sheets

(51) Int. Cl.
- *B60R 11/02* (2006.01)
- *B64D 11/00* (2006.01)
- *F16M 11/38* (2006.01)
- *F16M 11/04* (2006.01)
- *F16M 13/00* (2006.01)
- *B60N 2/75* (2018.01)
- *F16M 11/10* (2006.01)
- *B60R 11/00* (2006.01)
- *A47B 23/04* (2006.01)

(52) U.S. Cl.
CPC ...... *B64D 11/0015* (2013.01); *B64D 11/0638* (2014.12); *F16M 11/041* (2013.01); *F16M 11/10* (2013.01); *F16M 11/38* (2013.01); *F16M 13/00* (2013.01); *A47B 23/042* (2013.01); *A47B 23/044* (2013.01); *B60R 2011/0007* (2013.01); *B60R 2011/008* (2013.01); *B60R 2011/0012* (2013.01); *B60R 2011/0015* (2013.01); *B60R 2011/0071* (2013.01); *B60R 2011/0075* (2013.01); *B60R 2011/0082* (2013.01); *B60R 2011/0294* (2013.01); *F16M 2200/08* (2013.01)

(56) References Cited

U.S. PATENT DOCUMENTS

| | | | | |
|---|---|---|---|---|
| 5,413,035 | A * | 5/1995 | Fernandez | B60N 3/005 100/44 |
| 6,192,806 | B1 | 2/2001 | Chen | |
| 7,073,449 | B2 * | 7/2006 | Pipkin | A47B 23/00 108/25 |
| 7,311,354 | B2 * | 12/2007 | Giasson | B64D 11/06 297/145 |
| 8,387,938 | B2 * | 3/2013 | Lin | G06F 1/1632 248/397 |
| 9,067,682 | B2 * | 6/2015 | Pajic | A47B 23/00 |
| 9,877,584 | B2 * | 1/2018 | Wu | A47B 13/08 |
| 2007/0283855 | A1 * | 12/2007 | Pozzi | A47B 23/043 108/44 |
| 2012/0074286 | A1 | 3/2012 | Chou | |
| 2013/0264298 | A1 * | 10/2013 | Shih | B64D 11/06 211/26 |
| 2013/0314861 | A1 * | 11/2013 | Burford | H05K 7/00 361/679.01 |
| 2014/0252718 | A1 | 9/2014 | Rieman | |
| 2014/0311388 | A1 * | 10/2014 | Korpi | A47B 23/001 108/6 |
| 2015/0175265 | A1 * | 6/2015 | Thiele | B64D 11/06 297/188.04 |
| 2016/0015141 | A1 * | 1/2016 | Feinberg | A47B 23/042 206/45.24 |
| 2017/0166141 | A1 * | 6/2017 | Pajic | B64D 11/00152 |

FOREIGN PATENT DOCUMENTS

| | | | |
|---|---|---|---|
| WO | 200002745 | 1/2000 | |
| WO | WO-2014163579 A1 * | 10/2014 | ............ B64D 11/06 |

* cited by examiner

PORTABLE ELECTRONIC DEVICE HOLDER FOR TRAY TABLES

CROSS REFERENCE TO RELATED APPLICATIONS

This application is related to and claims priority benefits from U.S. Provisional Application Ser. No. 62/218,879 ("the '879 application"), filed on Sep. 15, 2015, entitled TABLET HOLDER IN AIRPLANE SEAT'S FOOD TRAY. The '879 application is hereby incorporated in its entirety by this reference.

FIELD OF THE INVENTION

The invention relates to portable electronic device holders for use with passenger seats or the like, and more particularly to portable electronic device holders for tray tables for use with passenger seats.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rests of the passenger seats.

With the advent of portable electronic devices ("PEDs"), such as tablet computers, mobile phones, smart phones, handheld video game systems, personal digital assistants, palmtop computers, DVD players, data and audio-video media, multi-media enabled devices, and other similar electronic devices, many passengers prefer to use their own PEDs, rather than the OBE or IFE components that are mounted in the passenger seats. The rate at which PEDs, such as mobile phones, tablets, portable computers, personal digital assistants ("PDAs"), and other similar devices, have been evolving has been exponential. These devices are constantly increasing in functions and changing in size, making them more portable and at the same time able to perform more tasks. This evolution has led to passengers carrying their personal information and media on these devices with the expectation of using them while traveling.

To this point, there have been very few examples of the passenger seats that can accommodate these personal PEDs, other than providing a location on a tray table, such as a groove to hold the PED, and sometimes a power connection to charge them. However, the mounting location on the tray table takes space away from the food tray, making it more complicated to use for other activities like eating.

Other solutions to date involve attaching holders (either provided by airlines or customer-purchased) to the backs of passenger seats as an add-on device. A drawback to this solution is that most cases are not adaptable to a large range of differing sizes and shapes of PEDs (e.g., a case for a mobile phone often is not sized to accommodate a tablet or surface computer). Furthermore, because the holder is mounted on another passenger's seat (i.e. the back of the seat of the passenger in front of the passenger having the holder), as the other passenger reclines the seat or otherwise moves around, such activities may adversely impact the viewing experience of the PED held in the holder. When such cases are provided by the passengers, the passenger is able to ensure that the case will fit his or her device, but cannot be sure that the case will fit all types of passenger seats. As a result, the passenger may be forced to purchase an item that he or she may not be able to use on any other occasion. When provided by the airline, this solution creates the additional problem of having to carry on the plane a large amount of cases to provide for passengers, while also having to ensure that passengers will not take the holders with them after the flight.

As a result, there is still a need for a support for PEDs that is always available and adaptable to a wide range of PED sizes, shapes, and thicknesses, and that does not create the need for an extra case or coupling assembly. Such a solution eliminates the need for airlines to provide a large number of cases, which represents additional weight and the need for additional storage space, as well as eliminating the costs for passengers to purchase an additional case for his or her PED. Such a solution also allows passengers to use their PEDs with or without a case, and to make the tray tables available for meals, documents, or any other object, or to allow passengers to stow the tray tables while still having the PEDs securely placed for use and/or viewing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a tray table assembly can comprise a table body. The tray table assembly can also comprise a support comprising a first end and a second end distal from the first end. The second end of the support can be pivotably attached to the table body proximate to the forward edge. The support can define a receiving area between the first end and the second end.

In some embodiments, the support can define: a bend portion between the first end and the second end; a first support portion between the bend portion and the first end; and a second support portion between the bend portion and the second end. In various embodiments, a distance from the bend portion to the first end can be greater than a distance from the bend portion to the second end. The bend portion, first support portion, and second support portion together can define a "C"-shaped profile in some embodiments.

In various embodiments, the first support portion can define a first contact point within the receiving area configured to contact a first side of a portable electronic device and a second contact point within the receiving area configured to contact a second side of the portable electronic device. The second end of the support can be pivotably attached to a lower surface of the table body in some embodiments.

In certain embodiments, the table body can define a support groove in an upper surface proximate to the forward edge. The support groove can be dimensioned to receive a portion of the support within the support groove when the support is in a stowed position. In some embodiments, the support groove can be dimensioned such that the portion of the support within the support groove is flush with the upper surface of the table body.

In some embodiments, the receiving area can be dimensioned to accommodate a portion of a portable electronic device within the receiving area. In certain embodiments, the support can be configured to be pivotable between a stowed position and a deployed position, wherein in the stowed position, the first end is positioned proximate to the upper surface of the table body, and wherein in the deployed position, the first end is spaced apart from the upper surface of the table body.

According to certain embodiments of the present invention, a passenger seat assembly can comprise: a passenger seat; and a table assembly. The table assembly can comprise a table body pivotably connected to the passenger seat, and a support comprising a first end, a second end distal from the first end and pivotably attached to the table body, and a bend portion between the first end and the second end.

In some embodiments, the passenger seat assembly further comprises a console, and the table body can be pivotably connected to the passenger seat via the console. In other embodiments, the table body can comprise a forward edge, an aft edge distal from the forward edge, an upper surface extending between the forward edge and the aft edge, and a lower surface extending between the forward edge and the aft edge. In certain embodiments, the support can be configured to cover a portion of the forward edge, a portion of the upper surface, and a portion of the lower surface in a stowed position.

In certain embodiments, the support can define a first support portion between the bend portion and the first end and a second support portion between the bend portion and the second end. In various embodiments, a distance from the bend portion to the first end can be greater than a distance from the bend portion to the second end. In various embodiments, the table body can define a support groove, and the support groove can be dimensioned to receive a portion of the support within the support groove when the support is in a stowed position.

According to certain embodiments of the present invention, a method can comprise the steps of: moving a tray table body from a stowed position to a deployed position relative to a passenger seat; selectively moving a support from a stowed position to a deployed position, the support pivotably attached to a tray table body at a first end; and positioning a device within a receiving area defined by the support.

In some embodiments, selectively moving the support from the stowed position to the deployed position can comprise pivoting the support to a maximum pivot angle. In various embodiments, the support comprises a second end distal from the first end, and positioning the device within the receiving area can comprise contacting a front side of the device with a first contact point on the support proximate to the first end and contacting a back side of the device with a second contact point on the support proximate to the second end.

In various embodiments, the method can further comprise: removing the device from the receiving area defined by the support; and returning the support to the stowed position by positioning the support within a support groove defined in an upper surface of the tray table body. In some embodiments, the tray table body can comprise a first table portion and a second table portion pivotably connected to the first table portion, and the method can further comprise moving the second table portion from an unfolded position to a folded position while the support is in the deployed position.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide seat assemblies tray table assemblies for use with passenger seats. While the adjustable support assemblies are discussed for use with aircraft seats, they are by no means so limited. Rather, embodiments of the adjustable support assemblies may be used in passenger seats or other seats of any type or otherwise as desired.

In some embodiments, disclosed are a tray table assemblies and associated methods, systems, devices, and various apparatuses. The tray table assembly can comprise a table body and a support.

Figure 1:
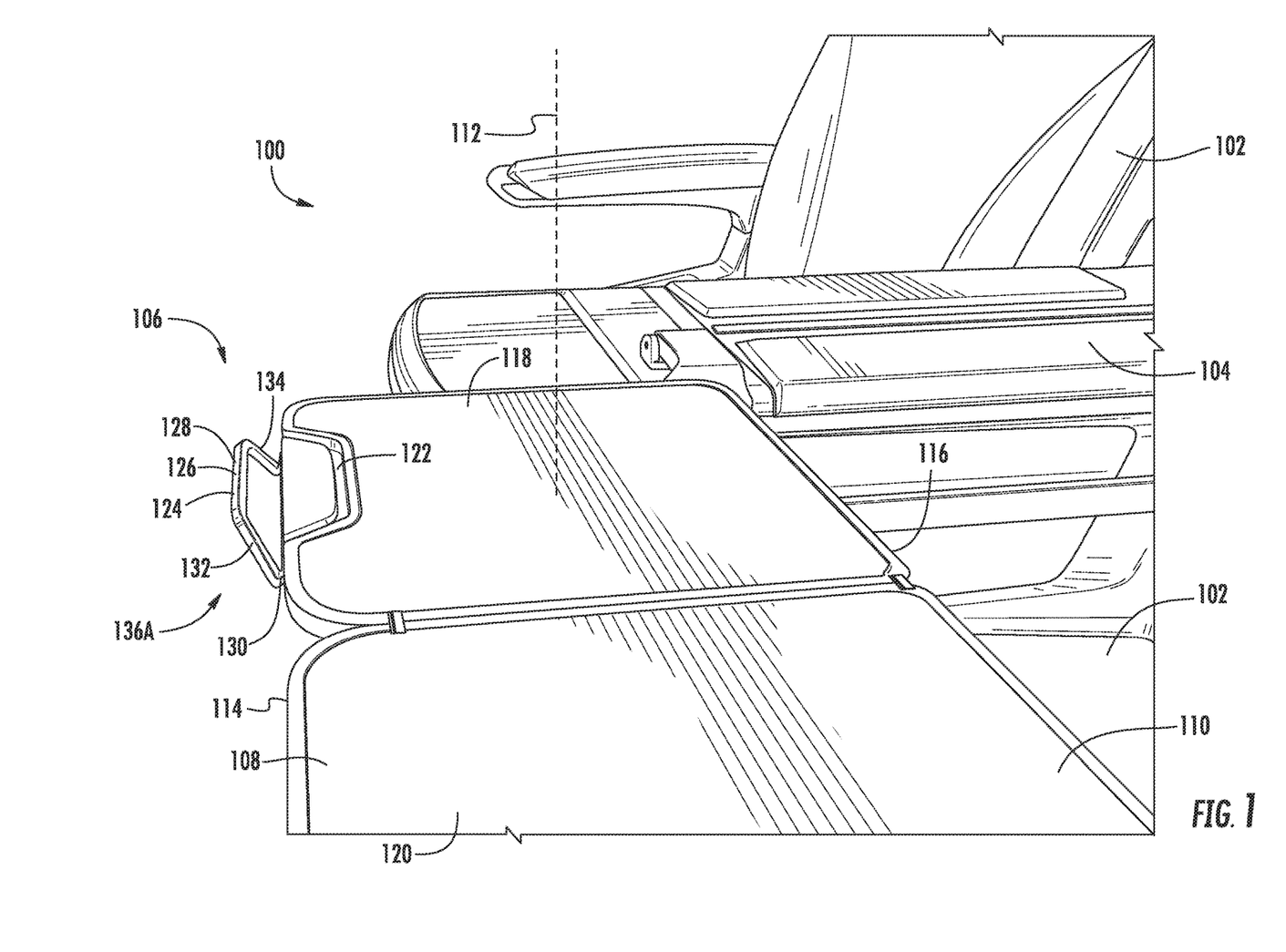
FIG. 1 is a perspective view of seat assembly comprising a seat and a table assembly according to certain embodiments of the present invention.

As illustrated in FIG. 1, a seat assembly 100 can comprise a passenger seat 102 and a tray table assembly 106. In some embodiments, the seat assembly 100 can comprise a console 104 between adjacent passenger seats 102. The console 104 can form an armrest and can be configured to provide media and electronic connections, to provide compartments or areas where a passenger can stow his or her belongings, to provide a location where the tray table assembly 106 can be stowed when not in use, and various other uses. The disclosure of the console 104 should not be considered limiting on the current disclosure.

The tray table assembly 106 can comprise a table body 108 and a support 124. As described in greater detail below, the support 124 is pivotably attached to the table body 108 such that the support 124 can be selectively moved between a deployed position 136A (shown in FIG. 1) and a stowed position 136B (shown in FIG. 3). The table body 108 can be constructed from various materials including, but not limited to, aluminum, stainless steel, aramid fibers, polycarbonate, polypropylene, other metallic materials, composite materials, other plastics, or other similar materials.

The table body 108 comprises a forward edge 114 and an aft edge 116 distal from the forward edge 114. As illustrated in FIG. 1, the forward edge 114 is the side furthest from the passenger seat 102 and the aft edge 116 is the side closest to the passenger seat 102 when the tray table assembly 106 is in the deployed position. The table body 108 also comprises an upper surface 110 extending from the forward edge 114 to the aft edge 116 and a lower surface 402 (illustrated in FIG. 4) extending from the forward edge 114 to the aft edge 116. The table body 108 is pivotably connected to the passenger seat 102 such that the table body 108 is movable between a deployed position and a stowed position. In the deployed position, as illustrated in FIGS. 1-6, the table body 108 can be used for eating, reading, working, or doing various other activities. Optionally, the table body 108 can be connected to the passenger seat 102 via the console 104 such that the table body 108 is movable relative to both the console 104 and the passenger seat 102; however, it is also contemplated that the table body 108 can be connected to various other locations of the seat assembly 100.

Optionally, the table body 108 can comprise a first table portion 118 and a second table portion 120 pivotably connected to the first table portion 118. In certain embodiments, the table body 108 can be selectively moved between an unfolded position, as illustrated in FIG. 1, and a folded position (not illustrated) while the table body 108 is in the deployed position. In the unfolded position, the upper surface 110 of the first table portion 118 and the upper surface 110 of the second table portion 120 can both face upwards along a vertical axis 112. In the folded position, the second table portion 120 is folded on top of the first table portion 118 such that the upper surface 110 of the second table portion 120 faces and can be in contact with the upper surface 110 of the first table portion 118, and the lower surface 402 of the second table portion 120 faces upwards along the vertical axis 112. It is contemplated that the passenger may move the table body 108 between the folded and unfolded position for various reasons such as wishing to temporarily exit the seat without having to stow the table body 108.

Figure 2:
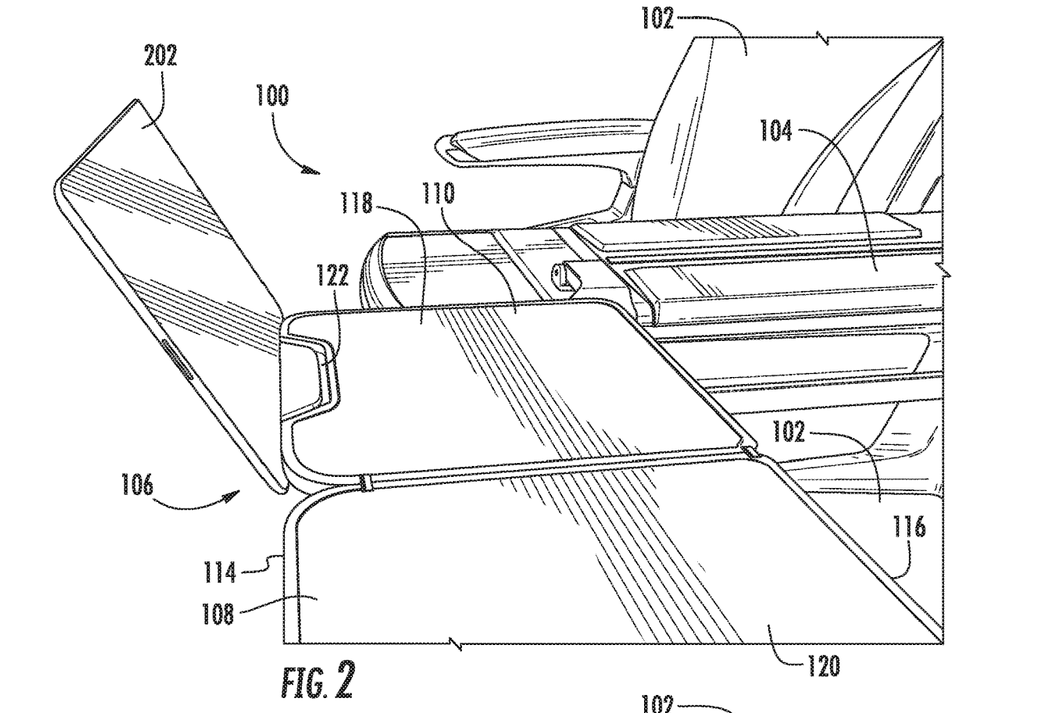
FIG. 2 is another perspective view of the seat assembly of FIG. 1 with the table assembly supporting a portable electronic device according to certain embodiments of the present invention.
Figure 3:
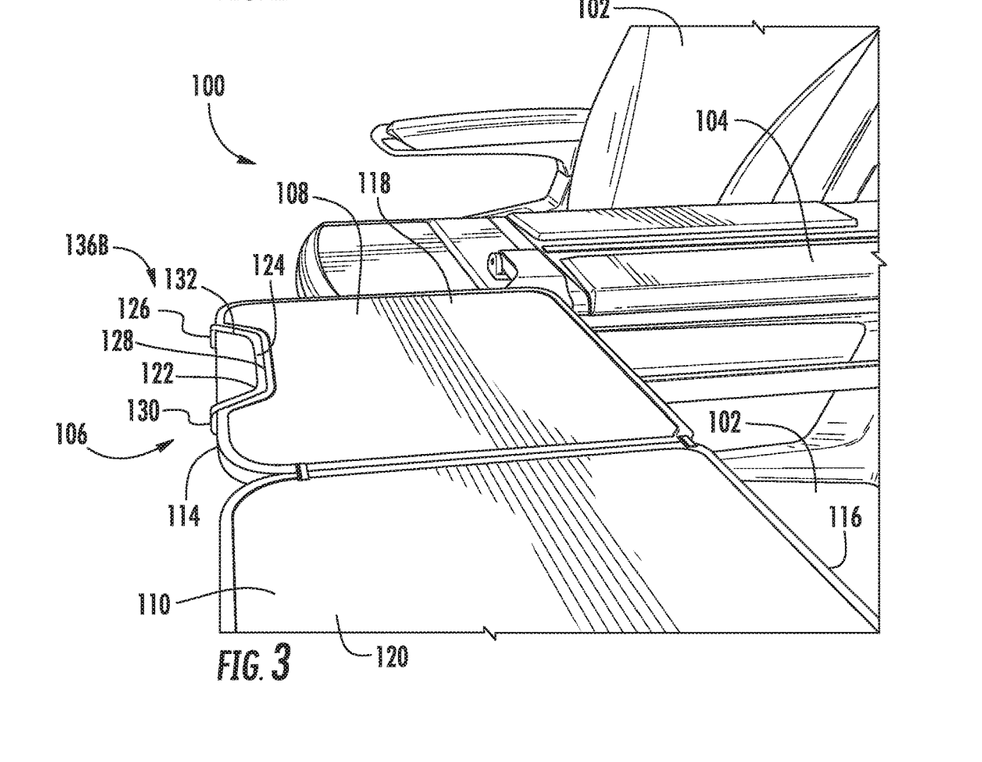
FIG. 3 is another perspective view of the seat assembly of FIG. 1 according to certain embodiments of the present invention.

In some embodiments, as illustrated in FIGS. 1-3, the table body 108 can define a support groove 122 in the upper surface 110 of one or both of table portions 118 and 120. The support groove 122 can be defined proximate to the forward edge 114 and optionally can extend to the forward edge 114. In certain embodiments, it is also contemplated that the support groove 122 can be defined proximate to other sides of the table body 108, such as the aft edge 116 or a side of the table body 108 distal from the console 104. The support groove 122 can be dimensioned to receive at least a portion of the support 124 when the support 124 is in the stowed position 136B, as will be described below in greater detail with reference to FIG. 3. In certain embodiments, a shape of the support groove 122 should not be considered limiting on the current disclosure as it is contemplated that various-shaped support grooves 122 can be present.

Figure 4:
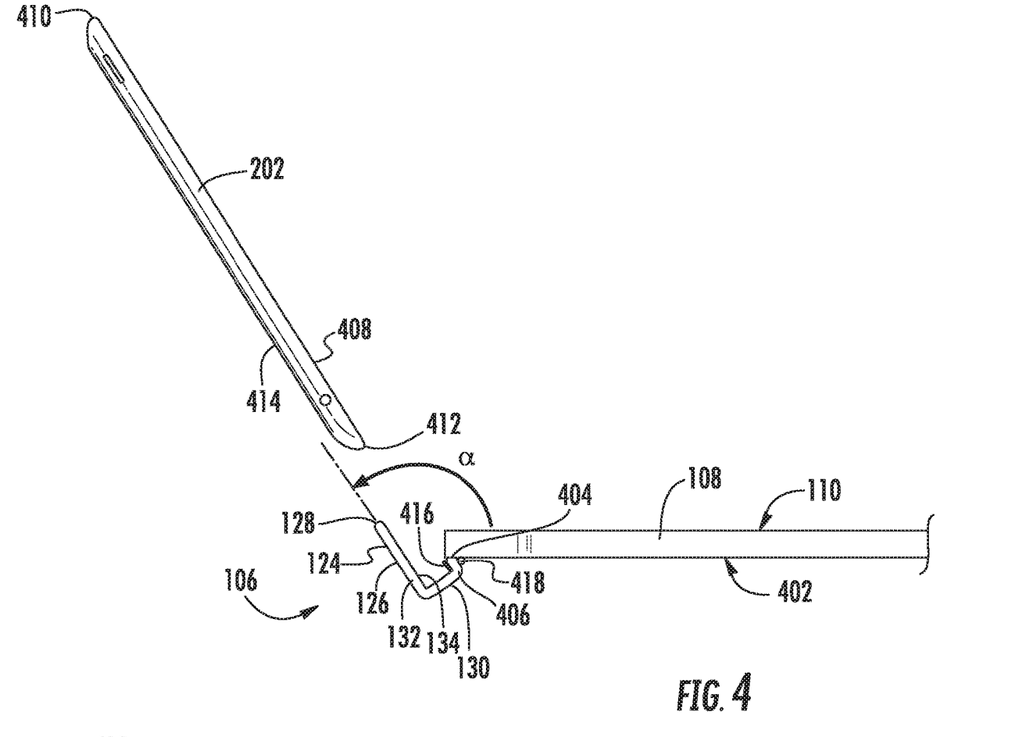
FIG. 4 is a side view of the table assembly of FIG. 1 and the portable electronic device of FIG. 2 according to certain embodiments of the present invention.

The support 124 comprises a main body 126 having a first end 128 and a second end 404 (illustrated in FIG. 4). The support 124 can be constructed from various materials including, but not limited to, aluminum, stainless steel, aramid fibers, polycarbonate, polypropylene, other metallic materials, composite materials, other plastics, or other similar materials. As illustrated in FIGS. 1 and 3, in some embodiments, it is contemplated that the main body 126 can be a frame-like structure comprising various segments. However, it is also contemplated that the main body 126 can be a solid structure, such as a structure formed from a sheet of material, or have various other designs.

The second end 404 (or a portion of the support 124 adjacent to the second end 404) can be pivotably attached to the table body 108 such that the support 124 can be selectively moved between the deployed position 136A illustrated in FIG. 1 and the stowed position 136B illustrated in FIG. 3. It is contemplated that the second end 404 can be pivotably attached to the table body 108 through various connectors such as pins, rods, clips, bolts, various types of hinges, or various other suitable connectors such that the support 124 can be selectively moved. It is contemplated that the second end 404 can be pivotably attached to various locations on the lower surface 402 of the table body 108. For example, it is contemplated that the second end 404 can be pivotably attached to the lower surface 402, within a recess defined on the lower surface 402, or on a protrusion extending downwards from the lower surface 402 along the vertical axis 112. It is also contemplated that the second end 404 can be pivotably attached to other parts of the table body 108, such as one of the sides of the table body 108.

In some embodiments, the support 124 can define a bend portion 130 between the first end 128 and the second end 404. In certain embodiments, the support 124 can define a receiving area 134 between the first end 128 and the second end 404. The receiving area 134 can be dimensioned to accept at least a portion of a portable electronic device 202 such that the support 124 supports the portable electronic device 202, as illustrated in FIG. 2. In various embodiments, the receiving area 134 can be dimensioned to accommodate a thickness of the portable electronic device 202, which is a distance from a front side to a back side as described in greater detail below. The receiving area 134 can also be dimensioned to accommodate a thickness of the table body 108, which is a distance from the upper surface 110 to the lower surface 402, such that the support 124 can be positioned around and cover at least a portion of the table body 108 in the stowed position 136B. For example, in various embodiments, in the stowed position 136B, the support 124 can cover a portion of the upper surface 110, a portion of the lower surface 402, and a portion of the forward edge 114.

Figure 5:
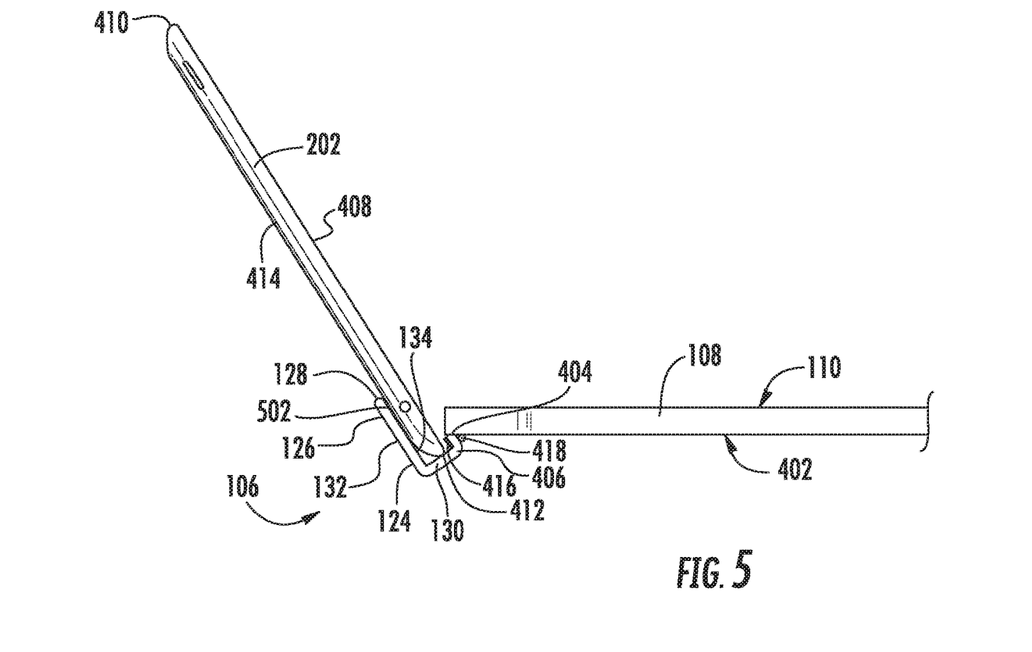
FIG. 5 is another side view of the table assembly of FIG. 1 and the portable electronic device of FIG. 2 according to certain embodiments of the present invention.
Figure 6:
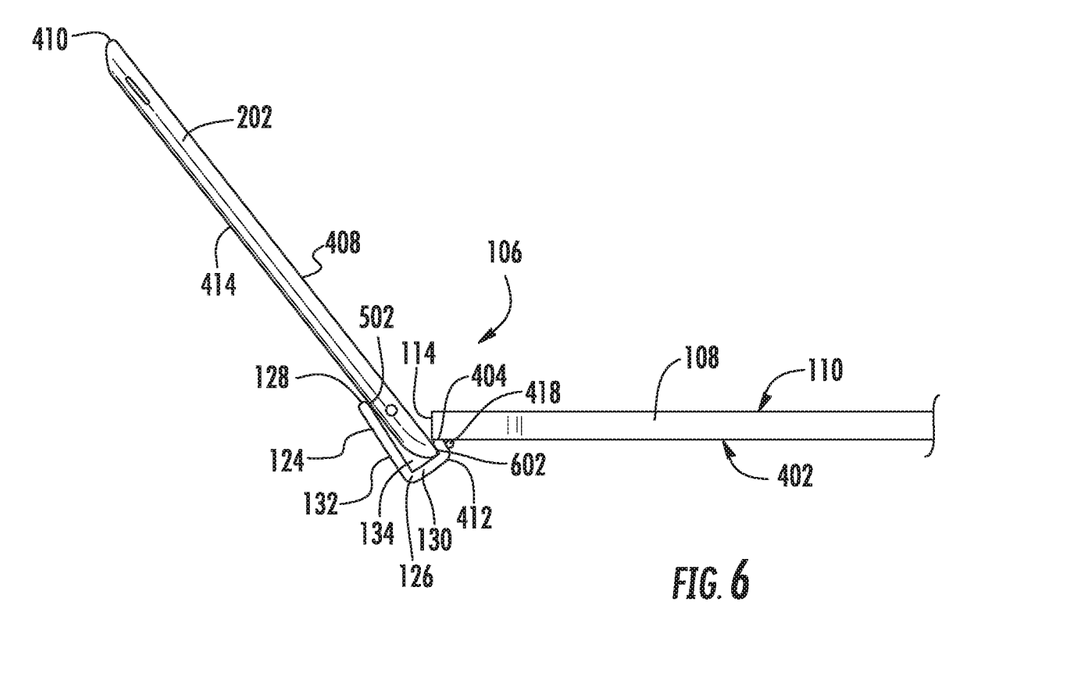
FIG. 6 is another side view of the table assembly of FIG. 1 and the portable electronic device of FIG. 2 according to certain embodiments of the present invention.

In some embodiments, the support 124 can define a first support portion 132 between the bend portion 130 and the first end 128 and a second support portion 406 between the bend portion 130 and the second end 404. In some embodiments, the support 124 can have a generally "C"-shaped profile, as illustrated in FIGS. 4-6. Optionally, in some embodiments, a height of the first support portion 132, which is a distance from the bend portion 130 to the first end 128, can be greater than a height of the second support portion 406, which is a distance from the bend portion 130 to the second end 404. It is also contemplated that in certain embodiments, the height of the first support portion 132 can be approximately the same as the height of the second support portion 406.

As illustrated in FIG. 1, the first support portion 132 can be trapezoidal-shaped. However, one skilled in the art will appreciate that the shape of the first support portion 132 should not be considered limiting as it is also contemplated that other shapes of the first support portion 132 can be present. For example, the first support portion 132 can be square, rectangular, triangular, pentagonal, or any other appropriate shape. Similarly, one having skill in the art will appreciate that the shape of the bend portion 130 or the second support portion 406 should not be considered limiting on the current disclosure.

Optionally, in some embodiments, the support 124 can comprise a gripping material 416 (shown in FIG. 4) on at least a portion of the support 124 to aid in gripping and securing the portable electronic device 202 within the receiving area 134. For example, as shown in FIG. 4, the gripping material 416 can be on the second support portion 406. It will be appreciated that gripping material can be placed at other portions of the support 124 in addition to or in place of the gripping material 416. For example, it is contemplated that the support 124 can comprise a gripping material at locations such as at the first end 128 of the support 124, on the first support portion 132, on the bend portion 130, and on the second support portion 406. The gripping material can be selected from products including, but not limited to, various rubbers, adhesives, plastics, leathers, or any other suitable gripping material.

As illustrated in FIG. 1, in the deployed position 136A, the first end 128 of the support 124 is spaced apart from the upper surface 110 of the table body 108 such that the passenger can gain access to the receiving area 134. In certain embodiments, the first support portion 132 can be spaced apart from the upper surface 110 of the table body 108.

Referring to FIG. 2, the passenger can position the portable electronic device 202 within the receiving area 134 when the support 124 is in the deployed position 136A such that the support 124 supports the portable electronic device 202. In certain embodiments, the support 124 can provide a hands-free support to the portable electronic device 202 (or other similarly shaped devices) while the table body 108 is deployed. In a some embodiments, where the table body 108 comprises the first table portion 118 and the second table portion 120, the support 124 can remain in the deployed position 136A even while the table body 108 is in the folded position. In certain embodiments, the passenger can exit the passenger seat 102 temporarily without having to remove the portable electronic device 202 from the support 124. As illustrated in FIG. 2, the support 124 can support the portable electronic device 202 without reducing available space on the upper surface 110 of the table body 108, thereby allowing the passenger to both support the portable electronic device 202 via the support 124 and make use of the table body 108.

Referring to FIG. 3, in the stowed position 136B, the first end 128 of the support 124 is positioned proximate to the upper surface 110. In various embodiments, in the stowed position 136B, the first end 128 of the support 124 can be positioned within the support groove 122. In certain embodiments, the first support portion 132 can also be positioned within the support groove 122. In some embodiments, the support groove 122 can be dimensioned such that the portion of the support 124 within the support groove 122 does not extend above the upper surface 110. In certain embodiments, the portion of the support 124 within the support groove 122 can be flush with the upper surface 110.

In some embodiments, it is contemplated that the support 124 can engage a portion of the lower surface 402 to define a maximum pivot angle α, which is the greatest extent to which the support 124 can pivot. Alternatively, as shown in FIG. 4, it is contemplated that the tray table assembly 106 can comprise a stopper 418 on the lower surface 402 that engages the support 124 at the maximum pivot angle α. In yet a further embodiment, the stopper 418 can be on the support 124 and can engage the lower surface 402 at the maximum pivot angle α. In some embodiments, the stopper 418 can be adjustable such that a passenger may dictate a viewing position of the portable electronic device 202 in the support 124. In some embodiments, it is contemplated that the maximum pivot angle α can be an angle at which a screen of the portable electronic device 202 can be angled for suitable viewing by the passenger when the portable electronic device 202 is supported by the support 124. In some embodiments, the maximum pivot angle α is between approximately 95° and approximately 170°. In certain embodiments, the maximum pivot angle α is approximately 120°.

Referring to FIGS. 4-6, a method of securing the portable electronic device 202 with the support 124 is provided. The portable electronic device 202 can comprise a back side 414, a front side 408, a top end 410, and a bottom end 412. The method can comprise selectively moving the support 124 from the stowed position 136B to the deployed position 136A.

Referring to FIG. 5, the method can further comprise positioning the portable electronic device 202 within the receiving area 134 such that a back side 414 of the portable electronic device 202 contacts the support 124 at a rear point of contact 502. In some embodiments, the rear point of contact 502 can be a position within the receiving area 134 where the portable electronic device 202 contacts the support 124 proximate to the first end 128, such as at a location on the first support portion 132. Optionally, the bottom end 412 can also contact the support 124. In some embodiments, it is contemplated that the back side 414 contacts the first support portion 132 and the bottom end 412 contacts the bend portion 130.

The method can also comprise moving the portable electronic device 202 such that the front side 408 engages the support 124 at a front point of contact 602. In some embodiments, the weight of the portable electronic device 202 can move the portable electronic device 202 such that the front side 408 contacts the support 124 at the front point of contact 602. In some embodiments, the front point of contact 602 can be a position within the receiving area 134 where the portable electronic device 202 contacts the support 124 proximate to the second end 404, such as at a location on the second support portion 406. In an alternative embodiment, the front point of contact can be where the portable electronic device 202 contacts a portion of the table body 108. The portable electronic device 202 having both the rear point of contact 502 and the front point of contact 602 can secure the portable electronic device 202 within the receiving area 134.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive;

and the invention is not limited to these example embodiments but rather encompasses all possible modifications and variations within the scope of the issued claims and their equivalents.

EC A. A tray table assembly comprising: a table body; and a support comprising a first end and a second end distal from the first end, the second end of the support pivotably attached to the table body, the support defining a receiving area between the first end and the second end.

EC B. The tray table assembly of any of the preceding or subsequent example combinations, wherein the support comprises: a bend portion between the first end and the second end; a first support portion between the bend portion and the first end; and a second support portion between the bend portion and the second end.

EC C. The tray table assembly of any of the preceding or subsequent example combinations, wherein a distance from the bend portion to the first end is greater than a distance from the bend portion to the second end.

EC D. The tray table assembly of any of the preceding or subsequent example combinations, wherein the bend portion, the first support portion, and the second support portion together define a "C"-shaped profile.

EC E. The tray table assembly of any of the preceding or subsequent example combinations, wherein the first support portion defines a first contact point within the receiving area configured to contact a first side of a portable electronic device and wherein the second support portion defines a second contact point within the receiving area configured to contact a second side of the portable electronic device.

EC F. The tray table assembly of any of the preceding or subsequent example combinations, wherein the second end of the support is pivotably attached to a lower surface of the table body.

EC G. The tray table assembly of any of the preceding or subsequent example combinations, wherein the table body defines a support groove in an upper surface of the table body proximate to a forward edge of the table body, wherein the support is pivotably attached to the table body proximate to the forward edge, and wherein the support groove is dimensioned to receive a portion of the support within the support groove when the support is in a stowed position.

EC H. The tray table assembly of any of the preceding or subsequent example combinations, wherein the support groove is dimensioned such that the portion of the support within the support groove is flush with the upper surface of the table body.

EC I. The tray table assembly of any of the preceding or subsequent example combinations, wherein the receiving area is dimensioned to accommodate a portion of a portable electronic device within the receiving area.

EC J. The tray table assembly of any of the preceding or subsequent example combinations, wherein the support is configured to be pivotable between a stowed position and a deployed position, wherein in the stowed position, the first end is positioned proximate to an upper surface of the table body, and wherein in the deployed position, the first end is spaced apart from the upper surface of the table body.

EC K. A passenger seat assembly comprising: a passenger seat; and a table assembly comprising a table body pivotably connected to the passenger seat, and a support comprising a first end, a second end distal from the first end and pivotably attached to the table body, and a bend portion between the first end and the second end.

EC L. The passenger seat assembly of any of the preceding or subsequent example combinations, further comprising a console, wherein the table body is pivotably connected to the passenger seat via the console.

EC M. The passenger seat assembly of any of the preceding or subsequent example combinations, wherein the table body comprises a forward edge, an aft edge distal from the forward edge, an upper surface extending between the forward edge and the aft edge, and a lower surface extending between the forward edge and the aft edge, and wherein the support is configured to cover a portion of the forward edge, a portion of the upper surface, and a portion of the lower surface in a stowed position.

EC N. The passenger seat assembly of any of the preceding or subsequent example combinations, wherein the support defines a first support portion between the bend portion and the first end and a second support portion between the bend portion and the second end, and wherein a distance from the bend portion to the first end is greater than a distance from the bend portion to the second end.

EC O. The passenger seat assembly of any of the preceding or subsequent example combinations, wherein the table body defines a support groove, and wherein the support groove is dimensioned to receive a portion of the support within the support groove when the support is in a stowed position.

EC P. A method comprising: moving a tray table body from a stowed position to a deployed position relative to a passenger seat; selectively moving a support from a stowed position to a deployed position, the support pivotably attached to a tray table body at a first end; and positioning a device within a receiving area defined by the support.

EC Q. The method of any of the preceding or subsequent example combinations, wherein selectively moving the support from the stowed position to the deployed position comprises pivoting the support to a maximum pivot angle.

EC R. The method of any of the preceding or subsequent example combinations, wherein the support comprises a second end distal from the first end, and wherein positioning the device within the receiving area comprises contacting a front side of the device with a first contact point on the support proximate to the first end and contacting a back side of the device with a second contact point on the support proximate to the second end.

EC S. The method of any of the preceding or subsequent example combinations, further comprising: removing the device from the receiving area defined by the support; and returning the support to the stowed position by positioning the support within a support groove defined in an upper surface of the tray table body.

EC T. The method of any of the preceding or subsequent example combinations, wherein the tray table body comprises a first table portion and a second table portion pivotably connected to the first table portion, the method further comprising moving the second table portion from an unfolded position to a folded position while the support is in the deployed position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table assembly comprising:
a table body comprising an upper surface and a lower surface opposite from the upper surface; and
a support comprising a first end and a second end opposite from the first end, the second end of the support pivotably attached to the lower surface of the table body such that the support is pivotable relative to the table body, the support defining a receiving area between the first end and the second end,
wherein the receiving area is dimensioned to accommodate a portion of a portable electronic device within the receiving area.

2. The tray table assembly of claim 1, wherein the support comprises:
a bend portion between the first end and the second end;
a first support portion between the bend portion and the first end; and
a second support portion between the bend portion and the second end.

3. The tray table assembly of claim 2, wherein a distance from the bend portion to the first end is greater than a distance from the bend portion to the second end.

4. The tray table assembly of claim 2, wherein the bend portion, the first support portion, and the second support portion together define a "C"-shaped profile.

5. The tray table assembly of claim 2, wherein the first support portion defines a first contact point within the receiving area configured to contact a first side of a portable electronic device and wherein the second support portion defines a second contact point within the receiving area configured to contact a second side of the portable electronic device.

6. The tray table assembly of claim 1, wherein the table body defines a support groove in the upper surface of the table body proximate to a forward edge of the table body, wherein the support is pivotably attached to the table body proximate to the forward edge, and wherein the support groove is dimensioned to receive a portion of the support within the support groove when the support is in a stowed position.

7. The tray table assembly of claim 6, wherein the support groove is dimensioned such that the portion of the support within the support groove is flush with the upper surface of the table body.

8. The tray table assembly of claim 1, wherein the support is pivotable relative to the table body between a stowed position and a deployed position, wherein in the stowed position, the first end is positioned proximate to the upper surface of the table body, and wherein in the deployed position, the first end is spaced apart from the upper surface of the table body.

9. A tray table assembly comprising:
a table body comprising an upper surface and a lower surface opposite from the upper surface; and
a support comprising a first end and a second end opposite from the first end, the second end of the support pivotably attached to the lower surface of the table body such that the support is pivotable relative to the table body, the support defining a receiving area between the first end and the second end,
wherein the support is pivotable relative to the table body between a stowed position and a deployed position,
wherein in the stowed position, the first end is positioned proximate to the upper surface of the table body, and wherein in the deployed position, the first end is spaced apart from the upper surface of the table body.

10. The tray table assembly of claim 9, wherein the receiving area is dimensioned to accommodate a portion of a portable electronic device within the receiving area.

11. The tray table assembly of claim 9, wherein the support comprises:
a bend portion between the first end and the second end;
a first support portion between the bend portion and the first end; and
a second support portion between the bend portion and the second end.

12. The tray table assembly of claim 9, wherein the table body defines a support groove in the upper surface of the table body proximate to a forward edge of the table body, wherein the support is pivotably attached to the table body proximate to the forward edge, and wherein the support groove is dimensioned to receive a portion of the support within the support groove when the support is in a stowed position.

13. A tray table assembly comprising:
a table body comprising an upper surface and a lower surface opposite from the upper surface; and
a support comprising a first end and a second end opposite from the first end, the second end of the support pivotably attached to the lower surface of the table body such that the support is pivotable relative to the table body, the support defining a receiving area between the first end and the second end,
wherein the support comprises:
a bend portion between the first end and the second end;
a first support portion between the bend portion and the first end; and
a second support portion between the bend portion and the second end.

* * * * *